United States Patent [19]

Zimmermann et al.

[11] 4,331,781
[45] May 25, 1982

[54] PROCESS FOR THE PREPARATION OF A POLYVINYL ALCOHOL COMPLEX COMPOUND IN THE PRESENCE OF AN ORGANIC BORIC ACID DERIVATIVE

[75] Inventors: Wolfgang Zimmermann, Kelkheim; Günther Pospich, Frankfurt am Main, both of Fed. Rep. of Germany

[73] Assignee: Hoechst Aktiengesellschaft, Frankfurt am Main, Fed. Rep. of Germany

[21] Appl. No.: 223,811

[22] Filed: Jan. 9, 1981

[30] Foreign Application Priority Data

Jan. 11, 1980 [DE] Fed. Rep. of Germany ....... 3000839

[51] Int. Cl.$^3$ ................................................ C08F 8/12
[52] U.S. Cl. ..................................................... 525/61
[58] Field of Search ......................................... 525/61

[56] References Cited

U.S. PATENT DOCUMENTS

| | | | |
|---|---|---|---|
| 2,607,765 | 8/1952 | Czerwin et al. | 525/61 |
| 3,135,648 | 6/1964 | Hawkins | 260/29.6 BM |
| 3,320,200 | 5/1967 | Kane | 525/61 |
| 3,409,598 | 11/1968 | Takigawa et al. | 525/61 |
| 3,488,337 | 1/1970 | Jones | 525/61 |
| 4,098,969 | 7/1978 | Zimmermann et al. | 525/61 |

FOREIGN PATENT DOCUMENTS

| | | |
|---|---|---|
| 1570282 | 2/1970 | Fed. Rep. of Germany . |
| 829634 | 3/1960 | United Kingdom . |
| 1168757 | 10/1969 | United Kingdom . |

*Primary Examiner*—Stanford M. Levin
*Attorney, Agent, or Firm*—Curtis, Morris & Safford

[57] ABSTRACT

With polybasic inorganic acids, for example boric acid, polyvinyl alcohol forms complex compounds, which, in the form of a gel, are suitable as adhesives. PVAL complex compounds are prepared in simple manner by subjecting to alcoholysis a polyvinyl ester in the presence of an organic boric acid derivative complexing agent. The reaction is carried out in alcoholic solution and the complexing agent should be soluble in alcohol. As starting material polyvinyl acetate is preferred, and methanol is preferred as alcohol. The PVAL complex compounds prepared in this way are used, inter alia, as binders and thickening agents for coating substances.

6 Claims, 1 Drawing Figure

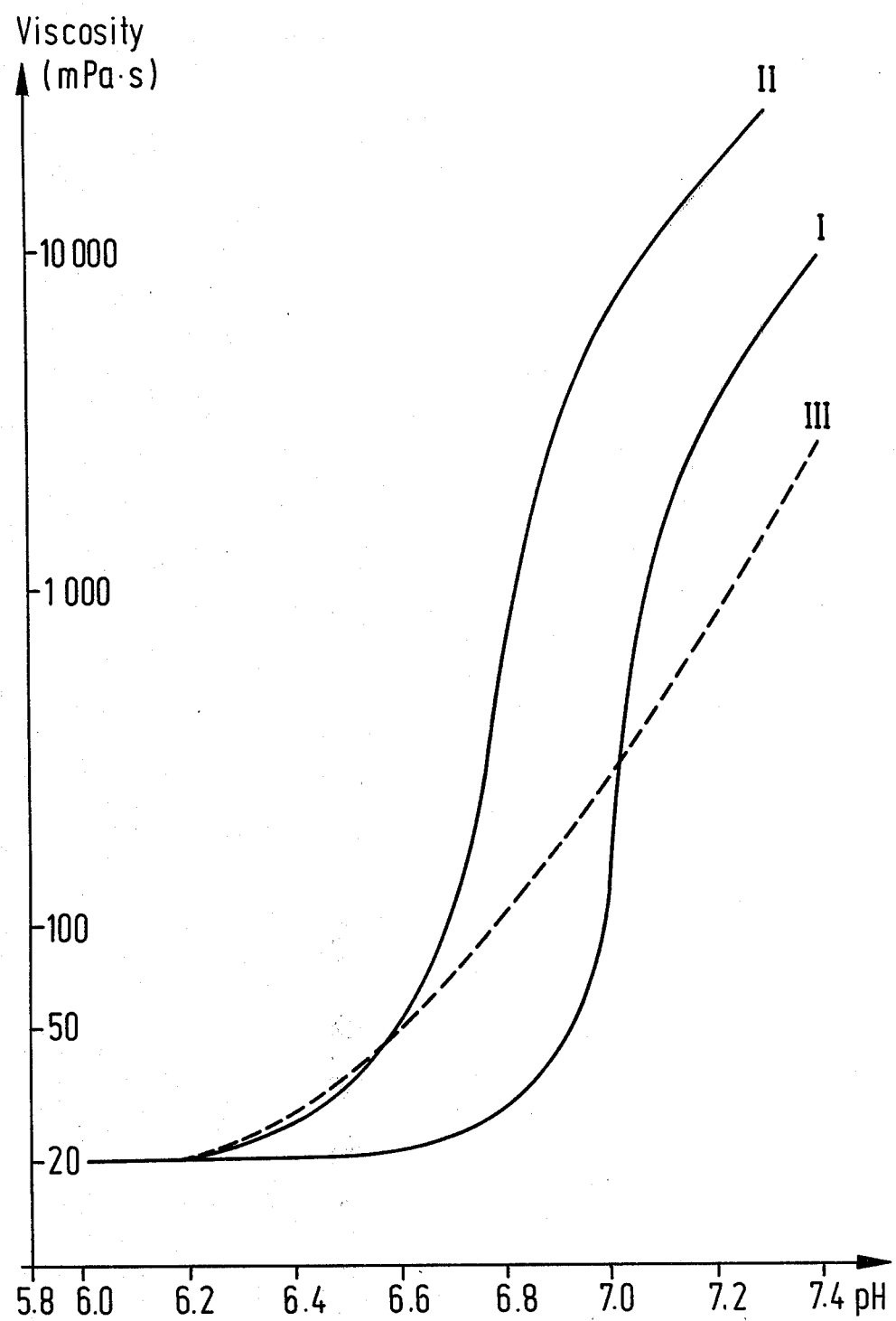

PROCESS FOR THE PREPARATION OF A POLYVINYL ALCOHOL COMPLEX COMPOUND IN THE PRESENCE OF AN ORGANIC BORIC ACID DERIVATIVE

The invention relates to a process for preparing a complex compound of polyvinyl alcohol and a compound which forms complexes with hydroxy compounds and the polyvinyl alcohol complex compound prepared according to this process.

It is known that polyvinyl alcohol (PVAL) forms complexes with polybasic inorganic acids, for example boric acid (see J. G. Pritchard, Polyvinyl Alcohol, Gordon and Breach Science Publishers, London, 1970, pages 73 and 74). A gel which is suitable for the preparation of adhesives is obtained from the aqueous PVAL solution because of complex formation. Instead of boric acid other watersoluble inorganic boron compounds can be used, such as borax, sodium metaborate and sodium pentaborate (see U.S. Pat. No. 3,135,648). The gel is obtained in known manner by mixing a hot aqueous solution of the boron compound with a hot aqueous PVAL solution or by mixing the boron compound with PVAL in cold water and subsequently heating the mixture or by mixing the boron compound with PVAL in dry state and by subsequently heating the mixture in water at the place of application.

The known processes for preparing PVAL complexes have several disadvantages. For example, the inorganic boron compounds mentioned above are soluble in water to a limited extent only so that relatively large volumes of the solutions are required. Also the preparation of homogeneous mixtures is difficult, because when adding a dissolved boron compound to a PVAL solution, the insoluble PVAL complex precipitates because of a local overconcentration on the place of addition. Moreover, in dry state, PVAL and boron compounds have different grain sizes and densities and therefore the dry mixture tends to disintegrate during storage and transport. It is subject of the invention to prepare, in simple manner and without the disadvantages mentioned above, the PVAL which has homogeneously reacted with a complexing agent, independently of the grain size.

The invention relates to a process for preparing a complex compound of polyvinyl alcohol and a compound, forming complexes with hydroxy compounds, and is characterized in that a polyvinyl ester is subjected to alcoholysis under conditions known per se in alcoholic solution in the presence of a compound soluble in alcohol which directly acts as complexing agent or is transformed into a complexing agent under the reaction conditions.

The starting material used is a polyvinyl ester, the acidic component of which preferably has 1, 2 or 3 carbon atoms. The degree of polymerization of the polyvinyl ester preferably is 400 to 10,000 and especially 450 to 6,000 (determined from the weight average of the molecular weight, ascertained according to the light scattering method with mercury vapor light). Polyvinyl acetate is especially suitable. The polyvinyl ester is commonly prepared by mass polymerization or preferably by solution polymerization, the solvent being a lower aliphatic alcohol with 1, 2 or 3 carbon atoms, preferably methanol.

Alcoholysis of the polyvinyl ester is carried out with a lower aliphatic alcohol with preferably 1, 2 or 3 carbon atoms. Methanol is especially suitable. The concentration of the polyvinyl ester in the alcoholic solution is, in general, 10 to 70 percent by weight, preferably 15 to 60 percent by weight.

The alcoholysis, preferably methanolysis, is carried out in the presence of a basic catalyst. Especially suitable catalysts are alkali metal alcoholates or alkali metal hydroxides, for example sodium methylate, potassium methylate, sodium ethylate, potassium ethylate as well as sodium hydroxide and potassium hydroxide. The catalyst is employed in an amount of 1 to 30 percent by weight, preferably 3 to 20 percent by weight (relative to polyvinyl ester). It is recommendable to use the catalyst in dissolved form, the solvent preferably being the alcohol in which the polyvinyl ester is dissolved. The essential feature of the process according to the invention is that the alcoholysis is performed in the presence of a compound which is soluble in the lower aliphatic alcohol mentioned above and which directly acts as complexing agent or is converted into a complexing agent under the reaction conditions. Suitable "masked" complexing agents are, above all, organic boric acid derivatives, especially boric acid esters with preferably 1, 2 or 3 carbon atoms in the alcohol component. Examples hereof are boric acid trimethyl ester, boric acid triethyl ester and boric acid tripropyl ester. The boron compound soluble in alcohol is used in an amount of 0.5 to 50 percent by weight, preferably 1 to 40 percent by weight (relative to polyvinyl ester). Advantageously, the boron compound is employed in the form of a solution; in this case, the preferred solvent is the alcohol in which the polyvinyl ester is dissolved. The presence of a complexing agent in dissolved form during the formation of the PVAL from the polyvinyl ester has the surprising advantage that complexing of the PVAL takes place very homogeneously, that means equally distributed over the PVAL molecular chains. The FIGURE shows how the viscosity of 4% by weight aqueous solutions of PVAL complex compounds obtained according to Examples 4 and 5 of the invention, varies depending on the pH (see graphs I and II). For comparison, the FIGURE also displays the corresponding graph of the solution of a PVAL complex compound prepared in usual manner according to comparative Example b with boric acid (see graph III).

Alcoholysis, in general, is carried out at a temperature of 10° to 50° C., preferably from 20° to 40° C. The pH of the reaction mixture usually is in the range from 8 to 14, preferably 9 to 12.

A preferred method of carrying out the process of the invention comprises first homogeneously mixing a polyvinyl ester solution with a solution of a complexing agent, then mixing this mixture uniformly with a catalyst solution while stirring and subsequently leaving to stand the reaction mixture thus obtained, optionally while stirring or kneading. The resulting gel is optionally reduced to small pieces, preferably by cutting with knives or by the aid of a cutting mill, it is washed with the alcohol used in each case, and finally it is dried cautiously, preferably at a temperature of 60° to 120° C., and optionally under inert gas, preferably nitrogen.

The process according to the invention may also be carried out continuously in a manner known per se, preferably by continuously applying a homogeneous mixture of polyvinyl ester solution, catalyst solution and solution of complexing agent to a continuously rotating conveyor belt, followed by removing the resulting gel and crushing the gel, and then, purifying it by washing and drying. This conveyor belt is trough shaped on its upper side and on its surface, which is in contact with the reaction mixture, it is optionally coated with a polyolefin, preferably with polyethylene (see German Patent Specification No. 1,720,709=British Patent Specification No. 1,168,757).

The PVAl complex compounds prepared according to the invention are used as binders and thickening agents for coating substances, especially in the paper industry, and as adhesives. Films which are manufactured from aqueous solutions of these PVAL complex compounds, are especially tough and abrasion-proof.

The following examples illustrate the invention. Percentages and proportions are given by weight.

EXAMPLES 1 to 5 and COMPARISON EXAMPLE A

A reaction vessel equipped with stirrer is charged with 100 g of a 30% methanolic solution of a polyvinyl acetate having a polymerization degree of 1,800, and the solution is mixed first with a 50% methanolic solution of boric acid trimethyl ester (BTM) and then with a 15% aqueous methanolic (1:9.4) sodium hydroxide solution, while stirring. The reaction mixture is left to stand at a temperature of 26° C. for 30 minutes. After only 15 minutes it has turned into a jelly and after another 15 minutes the methanolysis of the polyvinyl acetate is finished. The gel is cut with a knife, into cubes with an edge length of about 3 mm, it is washed free from alkali on a sieve with methanol and it is dried in a drying cabinet at a temperature of 100° C. (In the mother liquor no boron is detectable.) After drying granules with good flow properties are obtained. The dissolution properties of the granules (4% in water) are examined at a pH of 5.0 and 7.4 (Höppler-Viscosimeter) at 20° C.). The pH of 5.0 is adjusted with 0.01 N-sodium hydroxide solution and the pH of 7.4 with a 1% aqueous sodium trichloroacetate solution.

A comparison example a is carried out analogously, but without boric acid trimethyl ester solution.

Details are shown in the following table:

| Example | a | 1 | 2 | 3 | 4 | 5 |
|---|---|---|---|---|---|---|
| Amount of BTM (g) | — | 0.5 | 0.75 | 1 | 1.25 | 4 |
| Sodium hydroxide solution (g) | 2 | 2 | 2.5 | 3 | 3 | 10 |
| pH of the mixture | 10 | 10 | 10 | 10 | 10 | 10 |
| Viscosity at pH 5.0 4% solution (mPa . s) | 20 | 20 | 20 | 20 | 20 | 20 |
| Viscosity at pH of 7.4 4% solution (mPa . s) | 19 | 60 | 1,600 | 2,500 | 10,000 | (*) |

(*) Viscosity not measurable, as PVAL complex is insoluble

COMPARISON EXAMPLE B

A 4% aqueous solution of a mixture of 15 g of a polyvinyl alcohol, the 4% aqueous solution of which has a viscosity of 20 mPa·s at 20° C., and which has an ester number of 18 mg KOH/g, and 0.75 boric acid is prepared according to Example 4. The viscosity of this solution is 20 mPa·s at a pH of 5.0 and 1,250 mPa·s at a pH of 7.4 (Höppler-Viscosimeter at 20° C.). The pH must be adjusted with 1% aqueous sodium trichloroacetate solution because of precipitations which occured when using 0.01 N-sodium hydroxide solution.

What is claimed is:

1. Process for the manufacture of a complex compound of polyvinyl alcohol and a compound forming complexes with hydroxy compounds, which complex compound is capable of forming an aqueous solution which comprises subjecting a polyvinyl ester in alcoholic solution to alcoholysis under conditions known per se in the presence of an organic boric acid derivative which is soluble in alcohol and which directly acts as complexing agent of which is transformed into a complexing agent under the reaction conditions.

2. The process of claim 1, wherein polyvinyl acetate is used as polyvinyl ester.

3. The process of claim 1, wherein methanol is used as alcohol.

4. The process of claim 1, wherein a boric acid ester is used as organic boric acid derivative.

5. The process of claim 4, wherein boric acid trimethyl ester is used as boric acid ester.

6. The process of claim 1, wherein the alcoholysis is carried out continuously by means of a conveyor belt.

* * * * *